Feb. 11, 1936.  R. K. JEFFREY  2,030,637

DRILL MECHANISM

Original Filed Sept. 24, 1930

INVENTOR:
Robert K. Jeffrey,
By
Cushman, Darby & Cushman
ATTY.

Patented Feb. 11, 1936

2,030,637

UNITED STATES PATENT OFFICE 2,030,637

DRILL MECHANISM

Robert K. Jeffrey, Columbus, Ohio, assignor to The Jeffrey Manufacturing Company, a corporation of Ohio Original application September 24, 1930, Serial No. 484,190. Divided and this application April 30, 1935, Serial No. 19,092

17 Claims. (Cl. 255—46)

This invention relates to an improvement in drills of the type wherein means are provided for feeding a drill bit or auger while the drill is operating to drill or bore a hole, as, for example, in the face of a coal mine room, which borehole is adapted to receive a blasting charge.

An object of the invention is to provide a simple yet highly expedient means which will feed a drill bit or auger during operation of the drill motor and which may be manipulated to permit ready retraction and removal of the bit or auger carrying feed shaft.

A more specific object of the invention is to provide a rotatable feed nut for a drill which, when rotated with respect to a drill screw shaft, will feed said shaft, and which is so formed as to be readily releasable from said screw shaft to permit free sliding movement thereof.

Other objects of the invention will appear hereinafter, the novel features and combinations being set forth in the appended claims.

This application is a division of my application Serial No. 484,190 for a Drill mechanism, filed September 24, 1930.

Figure 1:
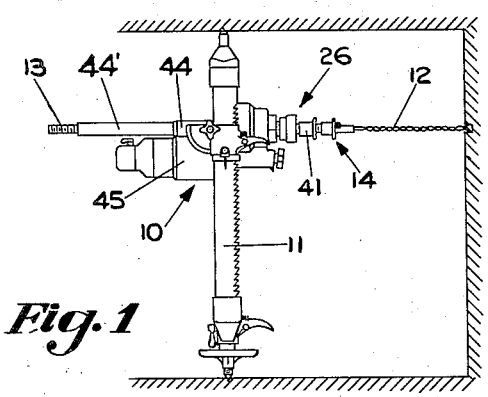
Fig. 1 illustrates a drill including my invention, in actual operation.
Figure 4:
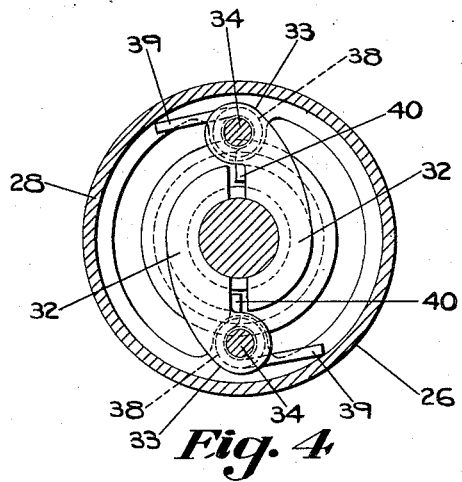
Fig. 4 is a transverse sectional view of my invention taken on the line 4—4 of Fig. 3 looking in the direction of the arrows.
Figure 2:
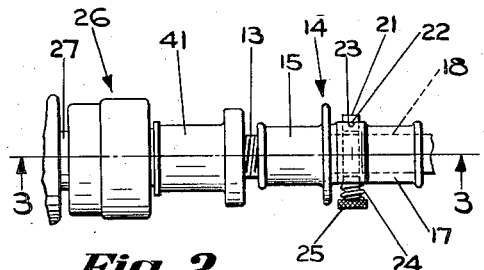
Fig. 2 is a plan view of the rotatable nut and associated elements which comprise my invention.

Referring to Fig. 1 of the drawing, there is seen a mine drill 10 mounted upon an extensible supporting post 11 and having a drill or auger 12 adapted to drill or bore a hole in the face of a mine room. The structural details of said mine drill 10 and post 11 are described in full detail in my above mentioned application.

It will suffice for a complete understanding of the particular invention herein involved to point out that the drill or auger 12 is rotated at a relatively high speed by the screw shaft 13 which is driven by the motor of the mine drill 10.

The auger 12 is rigidly but removably attached to the screw shaft 13 by a socket 14 which has a barrel portion 15 rigidly attached to one end of the shaft 13 by rivets 16 and has a portion 17 provided with a rectangular recess adapted to receive the tail piece or shank 18 of the auger 12. Said auger tail piece 18 is provided with a transversely extending groove 19 which, when the auger is assembled, is opposite a transversely extending groove 20 in the socket portion 17. A spring retained rotatable pin 21 is milled on one side and extends through the groove 20 in socket portion 17. Said pin 21 is adapted to remain in either of two positions which are 180 degrees apart, by an appropriate co-operating pin 22 and transverse groove 23. Spring 24 permits turning of the pin 21 by knurled head 25 thereof. When pin 21 is in the position illustrated in Fig. 3, the auger 12 will be clamped in socket 14. By rotating said pin 180 degrees, the auger 12 may be readily removed from said socket.

As was above set forth, the shaft 13 is driven from the motor of drill 10 to rotate the auger 12 at a relatively high speed. To provide a feeding of the auger 12, the shaft 13 is screw threaded and relative rotation is provided between a feed nut 26 and said shaft 13, whereby the shaft 13 will move longitudinally through said feed nut 26. When a feeding operation is to be performed, both the feed nut 26 and the shaft 13 are rotated at a relatively high speed but the feed nut 26 is rotated at a speed slightly higher than the speed of shaft 13. This rotary movement of said feed nut 26 is through sleeve 27 which is keyed to casing 28 thereof by key 28'. Due to the relative rotation between feed nut 26 and shaft 13, a feeding of the latter will be effected.

The feed nut 26 comprises the casing 28 having a cylindrical outer wall and a pair of inwardly extending flanges or webs 29 and 30 which form a peripheral pocket 31. A pair of elongated semicylindrical nut segments or sectors 32 is provided having threads on their inner surfaces adapted to co-operate with the threads on shaft 13. Each of said nut segments or sectors 32 is provided with a pair of axially spaced ears or lugs 33 adjacent one end thereof. The ears or lugs 33 are provided with aligned apertures adapted to receive pins 34 extending through suitable holes in flanges 29 and 30. The axis of said apertures is parallel with the axis of the nut sectors 32. The nut segments or sectors 32 are thus pivoted to the casing 28 on said pins 34. Said pins 34 are held in the casing 28 by shoulders 36 on said casing and by cotter pins 37 projecting through them. Flanges 29 and 30 co-operate with ears 33 to prevent longitudinal movement of the nut sectors 32 with respect to said casing 28.

Coil springs 38 are wound around the pins 34 and each has one free end 39 which bears against the inner surface of casing 28 and the other free end 40 of which co-operates with a nut sector 32 biasing said nut sector 32 about pin 34 whereby it will tend to disengage the threads on its inner surface from the threads on the shaft 13. It is thus evident that nut sectors 32 are normally urged to a thread disengaging relation with respect to shaft 13.

To maintain the threads of nut sectors 32 in engaging relation with the threads of shaft 13, sleeve 41 is provided, which is adapted to slide over the nut sectors 32. This sleeve 41 is provided at its outer end with a spring pressed detent 42 of usual construction, adapted to fit in a groove 43 in the periphery of the nut sectors 32.

It will be evident that the sleeve 41 may be readily slipped over the nut sectors 32 and retained in position by the detent 42 whereby upon any relative rotary movement taking place with respect to the shaft 13 and the feed nut 26, the shaft 13 will move longitudinally with respect to said feed nut 26. It is also evident that sleeve 41 may be readily removed from the nut sectors 32 and when this is done the springs 39 will automatically move the nut segments 32, 32 out of mesh with the shaft 13 which will then be free to slide. Ready removal of said shaft 13 from the drill is thereby effected.

Figure 3:
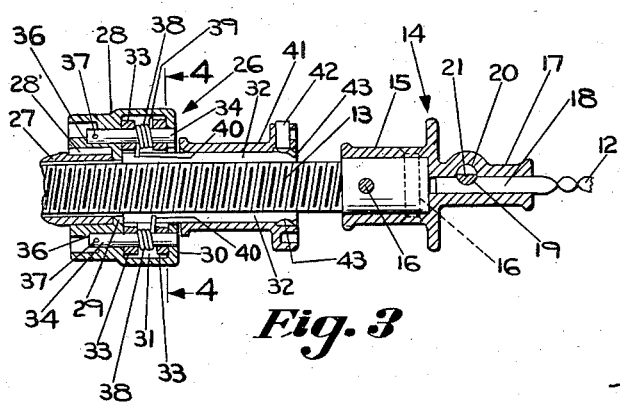
Fig. 3 is a longitudinal sectional view of my invention taken on the line 3—3 of Fig. 2 looking in the direction of the arrows.

While the nut sectors 32, 32 are held in mesh with the screw-threaded shaft 13 a spring pressed detent 42 holds the sleeve 41 over the extending semi-cylindrical nut sectors 32, as shown in Fig. 3. When the shaft 13 is rotated by means of the motor operated mechanism in the casing 45, the drill 12 is rotated and at the same time fed into the coal vein, as illustrated in Fig. 1. When the drill is being operated to feed, the casing 28 is rotated faster than shaft 13 relative to the extensions 44, 44', from the motor in casing 45 through the sleeve 27 and when the drill is retracted the casing 28 is held stationary. Consequently while the device is operating to retract the drill 12, the sectional nut structure 26 is held stationary. When the device is operating to advance the drill, nut 26 rotates at a high speed. Ample space is provided for removal of the sleeve 41 from the nut sectors 32 back of the drill socket 14, and when the sleeve 41 is removed from the nut sectors 32, the latter will be automatically disengaged from the screw shaft 13 by the springs 38, 38.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In apparatus of the class described, a feed nut comprising a plurality of segments, means mounting the segments for pivoting about axes eccentric to the axis of the nut, means tending to move the segments to inoperative position about their pivotal axes, and means adapted to engage the segments and hold them in operative relation.

2. In apparatus of the class described, a feed nut comprising a plurality of segments, means mounting the segments for pivoting about axes eccentric to the axis of the nut, means tending to move the segments to inoperative position about their pivotal axes, and a sleeve engageable around the segments to hold them in operative relation.

3. In apparatus of the class described, a feed nut comprising a plurality of segments, means mounting the segments for pivoting about axes eccentric to the axis of the nut, means tending to move the segments to inoperative position about their pivotal axes, a sleeve engageable around the segments to hold them in operative relation, and releasable means for securing the sleeve in position when so engaged.

4. For use in apparatus of the class described, a nut portion of substantially semi-cylindrical shape, said nut portion being axially elongated, and a lug projecting radially outwardly from said nut portion adjacent a lateral edge thereof, said lug being provided with a bore substantially parallel to the axis of said nut portion.

5. For use in apparatus of the class described, a nut portion of substantially semi-cylindrical shape, said nut portion being axially elongated, and a pair of lugs projecting radially outwardly from said nut portion adjacent a lateral edge thereof, said lugs being spaced longitudinally of said nut portion and being provided with aligned bores substantially parallel to the axis of said nut portion.

6. For use in apparatus of the class described, a nut portion of substantially semi-cylindrical shape, said nut portion being axially elongated, and a lug projecting radially outwardly from said nut portion adjacent a lateral edge thereof, said lug having provisions for the pivotal mounting of said nut portion on an axis parallel to the axis of said nut portion.

7. For use in apparatus of the class described, a feed nut housing comprising a substantially cylindrical body provided with an axial opening, said body having radially inwardly extending webs defining an annular cavity therebetween and surrounding said opening, there being aligned apertures in said webs at circumferentially spaced points.

8. For use in apparatus of the class described, a feed nut housing comprising a substantially cylindrical body provided with an axial opening, said body having radially inwardly extending webs defining an annular cavity therebetween and surrounding said opening, there being aligned apertures in said webs at circumferentially spaced points, and a shoulder on said body spaced outwardly from one of said webs, and partially blocking the outer ends of the apertures in said one of said webs.

9. In apparatus of the class described, a feed nut comprisng a plurality of segments, a carrier to which said segments are pivoted on axes parallel to the axis of the nut, said segments being swingable about their said axes between operative and inoperative relations, and means for holding the segments in operative relation.

10. In apparatus of the class described, a feed nut comprising a plurality of segments, a carrier to which said segments are pivoted on axes parallel to the axis of the nut, said segments being swingable about their said axes between operative and inoperative relations, and means for holding the segments in operative relation, said last named means comprising a ring embracing the segments.

11. In a drill mechanism feed nut, the combination with a plurality of nut segments having threaded inner surfaces forming a nut, means mounting the segments for pivotal movement about axes eccentric to the axis of the nut, and releasable means adapted to engage the segments and to hold them in operative relation, said means comprising a removable sleeve adapted when removed to permit movement of said segments to an inoperative relation.

12. In a drill mechanism feed nut, the combination with a plurality of elongated nut segments having threaded interior surfaces, apertured ears at one end of said segments, means co-operating with said ears for mounting said segments for pivotal movement about axes eccentric to the axis of the nut, and releasable means adapted to engage the segments and to hold them in operative relation, said means comprising a removable sleeve slidable over the free ends of said segments.

13. In a drill mechanism feed nut, the combination with a plurality of elongated nut segments having threaded interior surfaces, apertured ears at one end of said segments, means co-operating with said ears for mounting said segments for pivotal movement about axes eccentric to the axis of the nut, and releasable means adapted to engage the segments and to hold them in operative relation.

14. In a drill mechanism feed nut, the combination with a casing having spaced inwardly extending webs forming a peripheral pocket, of nut segments having threaded inner surfaces forming a nut, ears on said segments extending between said webs and into said pocket, pins projecting through said webs and ears and mounting said segments for pivotal movement on axes spaced from the axis of said nut, springs coiled about said pins urging said segments into inoperative position, and releasable means adapted to maintain said segments in operative relation, said means comprising a sleeve slidable over said segments.

15. In a drill mechanism feed nut, the combination with a casing having spaced inwardly extending webs forming a peripheral pocket, of nut segments having threaded inner surfaces forming a nut, ears on said segments extending between said webs and into said pocket, pins projecting through said webs and ears and mounting said segments for pivotal movement on axes spaced from the axis of said nut, and releasable means adapted to maintain said segments in operative relation, said means comprising a sleeve slidable over said segments.

16. In a drill mechanism feed nut, the combination with a casing having spaced inwardly extending webs forming a peripheral pocket, of nut segments having threaded inner surfaces forming a nut, ears on said segments extending between said webs and into said pocket, pins projecting through said webs and ears and mounting said segments for pivotal movement on axes spaced from the axis of said nut, springs coiled about said pins urging said segments into inoperative position, and releasable means adapted to maintain said segments in operative relation.

17. In a drill mechanism feed nut, the combination with a casing having spaced inwardly extending webs forming a peripheral pocket, of nut segments having threaded inner surfaces forming a nut, ears on said segments extending between said webs and into said pocket, pins projecting through said webs and ears and mounting said segments for pivotal movement on axes spaced from the axis of said nut, and releasable means adapted to maintain said segments in operative relation.

ROBERT K. JEFFREY.